(12) United States Patent
Hjerth et al.

(10) Patent No.: US 7,810,887 B2
(45) Date of Patent: Oct. 12, 2010

(54) METHOD AND AN ARRANGEMENT FOR PREVENTING OVERTURNING A DUMP VEHICLE

(75) Inventors: Kjell-Owe Hjerth, Braås (SE); Lennart Hjert, Braås (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 748 days.

(21) Appl. No.: 11/814,572

(22) PCT Filed: Mar. 1, 2005

(86) PCT No.: PCT/SE2005/000291

§ 371 (c)(1),
(2), (4) Date: Jul. 24, 2007

(87) PCT Pub. No.: WO2006/093438

PCT Pub. Date: Sep. 8, 2006

(65) Prior Publication Data

US 2010/0045092 A1    Feb. 25, 2010

(51) Int. Cl.
*B60P 1/16* (2006.01)
(52) U.S. Cl. ........................ 298/17 S; 340/440
(58) Field of Classification Search ............. 298/17 R, 298/19 R, 22 R, 22 P, 22 C, 21 R, 17 S; 280/6.154; 340/429, 440, 689; 180/41

See application file for complete search history.

(56) References Cited

U.S. PATENT DOCUMENTS

| | | | |
|---|---|---|---|
| 4,284,987 A | 8/1981 | Gibson et al. | |
| 4,682,145 A | 7/1987 | Brawner, Jr. | |
| 5,742,228 A | 4/1998 | Levy | |
| 6,027,173 A * | 2/2000 | Bettini | 298/17 S |

FOREIGN PATENT DOCUMENTS

| | | |
|---|---|---|
| DE | 20217027 U1 | 3/2004 |
| EP | 1153772 A2 | 11/2001 |
| GB | 2385452 A | 8/2003 |

OTHER PUBLICATIONS

International Search Report for corresponding International Application PCT/SE2005/000291.

* cited by examiner

*Primary Examiner*—Stephen Gordon
(74) *Attorney, Agent, or Firm*—WRB-IP LLP (57) ABSTRACT

A method for preventing overturning a dump vehicle, the vehicle including a forward vehicle section with a forward frame and a wheel axle supported by the frame. The dump vehicle further includes a rear vehicle section with a rear frame and at least one wheel axle supported by the frame. The dump vehicle further includes an articulation joint, which connects the forward frame and the rear frame and allows the forward frame and the rear frame to pivot in relation to each other about an axis extending in a longitudinal direction of the vehicle. During a tilting procedure for unloading material from a container of the dump vehicle, the method includes determining if there is a risk for a pair of wheels of the wheel axle of the forward vehicle section to lose ground contact or if the pair of wheels have already lost ground contact. A warning signal for preventing an uncontrolled rotation of the forward vehicle section relative to the rear vehicle section via the articulation joint is further established when it is determined that the wheels of the forward wheel axle have lost or are about to lose ground contact.

36 Claims, 6 Drawing Sheets

METHOD AND AN ARRANGEMENT FOR PREVENTING OVERTURNING A DUMP VEHICLE

BACKGROUND AND SUMMARY

The present invention relates to a method and an arrangement for preventing overturning a dump vehicle.

In connection with transportation of heavy loads, e.g. in contracting work, dump vehicles of the type of articulated haulers (also called frame-steered vehicles or dumpers) are frequently used. Such vehicles may be operated with large and heavy loads in areas where there are no roads, for example for transports in connection with road or tunnel building, sand pits, mines and similar environments.

A dump vehicle comprises a forward vehicle section (a so-called engine unit) which in turn comprises a forward frame, an engine, a cab, and a forward wheel axle supported by the frame. The dump vehicle further comprises a rear vehicle section (a so-called load-carrying unit) which in turn comprises a rear frame, a tiltably arranged container for carrying loads, and one or two rear wheel axles supported by the frame.

The frame of the engine unit is connected to the frame of the load-carrying unit by means of a special articulation joint allowing the engine unit and the load-carrying unit to pivot in relation to each other about an imaginary axis extending in the longitudinal direction of the vehicle. Thanks to the articulation joint, the engine unit and the load-carrying unit are allowed to move substantially independently of each other, which reduces stress loads acting on the vehicle, especially when operating in difficult terrain.

When the dump vehicle is unloaded in certain situations, there is a risk for overturning the forward vehicle section. More specifically, when the container is tilted, the material in the container may stick to the container. The centre of gravity of the dump vehicle will then move backwards. If the pair of wheels of the rearmost axle of the load-carrying unit does not have proper contact with the ground, there is a risk that the dump vehicle will rise and tilt backwards. In other words, the dump vehicle would in such a case rotate around a ground contact point defined by the pair of wheels on the forward wheel axle of the rear vehicle section. The wheels of the forward vehicle section would then lose ground contact and there is a risk for the forward vehicle section, which comprises the cab for an operator, to rotate in an uncontrolled manner around the articulation joint between the forward vehicle section and the rear vehicle section, which of course could lead to material damages and/or injuries.

It is desirable to achieve a method and an arrangement for preventing a turn-over of a dump vehicle with an articulation joint, which connects a forward frame and a rear frame, allowing the forward frame and the rear frame to pivot in relation to each other about an axis extending in a longitudinal direction of the vehicle.

A method according to an aspect of the present invention involves steps including, during a tilting procedure for unloading material from a container of the dump vehicle, determining if there is a risk for a pair of wheels of the wheel axle of the forward vehicle section to lose ground contact or if said pair of wheels have already lost ground contact, and establishing a warning signal for preventing an uncontrolled rotation of the forward vehicle section relative to the rear vehicle section via the articulation joint when it is determined that the wheels of the forward wheel axle has lost or is about to lose ground contact.

The wording "tilting procedure for unloading material from the container" not only comprises the time onwards from the actual motion start but also the time in preparation for the actual tilting motion. Thus, the wording "preventing unloading of material" comprises both preventing start of a tilting motion of the container and preventing continuation of, i.e interrupting or stopping, an already started tilting motion.

According to an aspect of the invention, the method comprises the step of determining if at least one wheel in a pair of wheels on the wheel axle supported on the rear frame loses, or is about to lose, ground contact, and using this information for determining the risk for the wheels of the wheel axle of the forward vehicle section to lose ground contact. Thus, for the specific type of vehicle with two bogie axles on the rear vehicle section, the knowledge that there is a high risk for raising the vehicle when only the wheels of one of the bogie axles have ground contact, is used.

According to an aspect of the invention, the method comprises the step of sensing an inclination of a bogie element, which is pivotably suspended in a frame beam of the rear vehicle section, and using this information for determining the risk for the wheels of the wheel axle of the forward vehicle section to lose ground contact.

According to an aspect of the invention, the method comprises the step of receiving said warning signal and automatically preventing tilting of the container. This may be achieved by hindering a supply of hydraulic fluid to a hydraulic tilting means, which is arranged between the rear frame and the container for tilting the container relative to the rear frame.

Further features of the invention and advantageous effects thereof will be apparent from the further claims and the following description.

BRIEF DESCRIPTION OF THE DRAWINGS

The invention will be explained below, with reference to the embodiments shown on the appended drawings, wherein.

DETAILED DESCRIPTION

Figure 1:
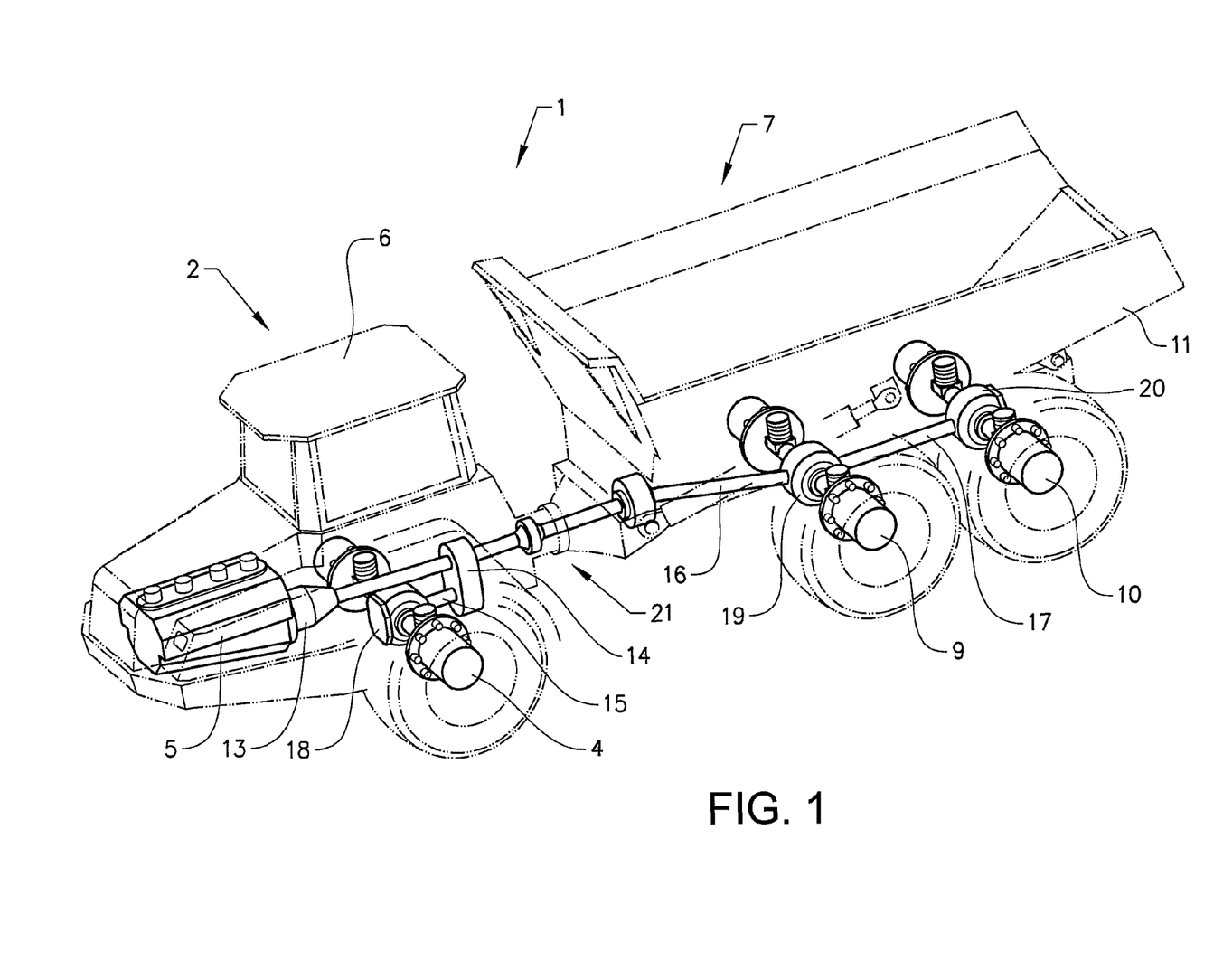
FIG. 1 illustrates an articulated hauler in a perspective, partly cut view.

FIG. 1 illustrates an articulated hauler 1 in a perspective, partly cut view. The articulated hauler 1 comprises a forward vehicle section 2 comprising a forward frame 3, see FIG. 2, a forward wheel axle 4, a source of motive power in the form of a diesel engine 5 for propelling the vehicle and a cab 6 for an operator. The articulated hauler 1 also comprises a rear vehicle section 7 comprising a rear frame 8, see FIG. 2, a forward wheel axle 9, a rear wheel axle 10 and a tiltable load-carrying container, or platform 11. The forward and rear wheel axle 9, of the rear vehicle section 7 are connected to the rear frame via a bogie arrangement 12, see FIGS. 2 and 3, and will therefore in the following be referred to as forward bogie axle 9 and rear bogie axle 10.

FIG. 1 further schematically illustrates a driveline of the articulated hauler 1. The driveline comprises a main gear box 13 in the form of an automatic transmission rotatively connected to an output shaft of the engine 5. The main gear box 13 has for example six forward gear ratios and two reverse gear ratios. The driveline further comprises a transfer gear box 14 rotatively connected to an output shaft of the main gear box 13. The transfer gear box 14 is arranged to distribute the power from the main gear box between the forward wheel axle 4 and the two rear bogie axles 9, 10. The transfer gear box 14 preferably has a low-gear register and a high-gear register.

A first, second and third drive shaft 15, 16, 17 extending in the vehicle longitudinal direction are rotatively connected to the transfer gear box 14 and to a central transmission 18, 19, 20 in each of the forward axle 4 and the two bogie axles 9, 10. A pair of transverse drive shafts extends in opposite directions from the associated central transmission. Each of said transverse drive shafts is rotatively connected to a wheel.

Figure 2:
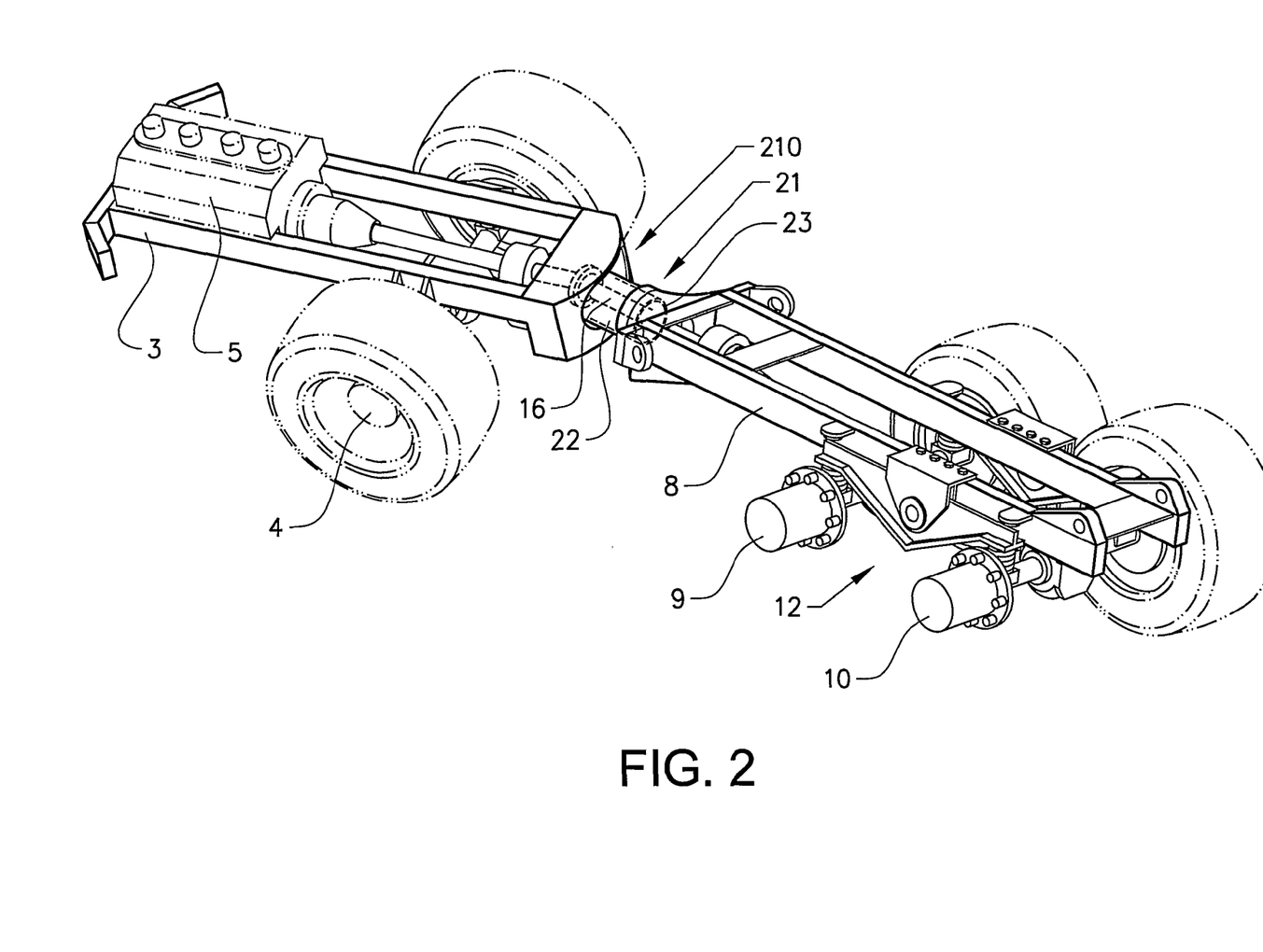
FIG. 2 illustrates a forward frame and a rear frame of the vehicle of FIG. 1.

FIG. 2 illustrates the forward frame 3 and the rear frame 8 in more detail in a perspective view. The forward frame 3 is connected to the rear frame 8 by means of a first articulation joint 210 allowing the forward frame 3 and the rear frame 8 to pivot relative to one another about a vertical axis for steering the vehicle. Thus, the articulated hauler 1 is a so-called frame-steered vehicle. A pair of hydraulic cylinders (not shown) is arranged one on each side of the articulation joint 210 and controlled by an operator via a steering wheel and/or a joy stick (not shown) for steering the vehicle.

A second articulation joint 21 is configured for allowing the forward frame 3 and the rear frame 8 to pivot relative to one another about an imaginary longitudinal axis, i.e. an axis extending in the longitudinal direction of the vehicle 1. The articulation joint comprises two correspondingly shaped tubular parts, a first part 22 secured to the forward frame 3 and a second part 23 secured to the rear frame, see also FIG. 3. The first part 22 is glidingly received in the second part 23 so that the forward frame 3 may pivot relative to the rear frame 8 about said longitudinal imaginary axis. Further, the second longitudinal drive shaft 16 extends through the second articulation joint 21.

In FIG. 2, the forward frame 3 is in a turned position relative to the rear frame 8, wherein the turning is accomplished via the first articulation joint 210. Further, the forward frame 3 is in a rotated position relative to the rear frame 8, wherein the rotation is achieved via the second articulation joint 21.

Figure 3:
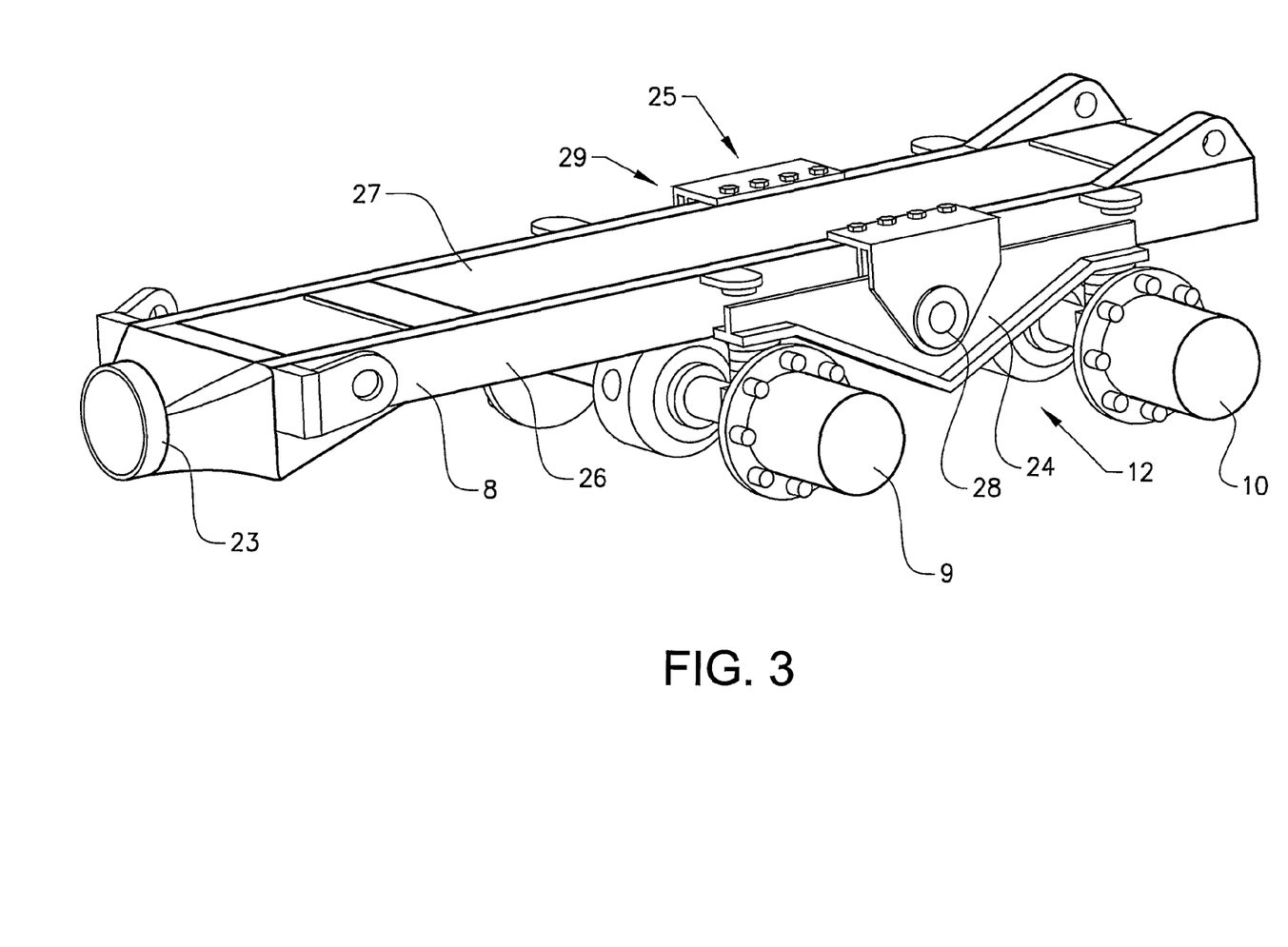
FIG. 3 illustrates a bogie arrangement of the vehicle of FIG. 1 in a perspective view.

FIG. 3 illustrates the bogie arrangement 12 in more detail in a perspective view. The bogie axles 9, 10 are supported by the rear frame 8 via a right and left bogie element 24, 25 extending in the longitudinal direction of the vehicle. The bogie element 24, 25 may be stiff, in the form of a beam, or somewhat flexible forming a spring, for example a blade spring. Each bogie element 24, 25 is arranged along an adjacent longitudinal frame beam 26, 27 in the rear frame and is pivotally suspended in the respective frame beam 26, 27 via a swivel joint 28, 29. The swivel joint 28, 29 is arranged between the bogie axles 9, 10 in the vehicle longitudinal direction. The bogie arrangement 12 is arranged to allow for a relative diagonal movement between the bogie elements 24, 25, that is to say a state in which the bogie elements are positioned with a different degree of inclination in relation to a horizontal plane.

Figure 4:
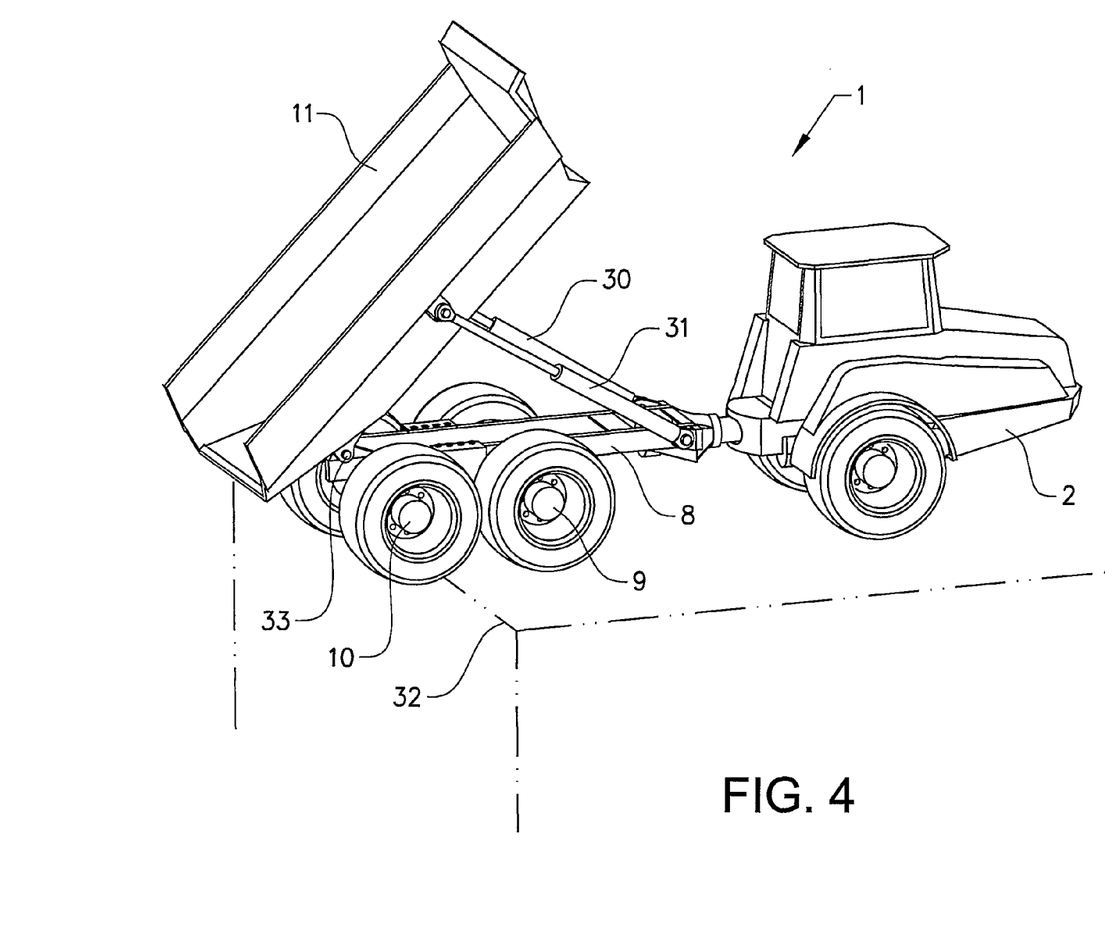
FIG. 4 illustrates an unloading operation of the vehicle of FIG. 1.

FIG. 4 illustrates an unloading operation of the container 11. The container 11 is connected to the rear frame 8 via a pivot joint 33 at the rear part of the rear frame 8. A pair of hydraulic cylinders 30, 31 are connected with a first end to the container 11 and a second end to the rear frame 8. The container 11 is tilted relative to the rear frame by activating the hydraulic cylinders 30, 31.

The dump vehicle 1 is adapted for preventing a turnover of the forward vehicle section 2 in the case that the vehicle 1 is raised, or about to be raised, during unloading of material. There is a risk for such raising of the vehicle 1 when the container 11 is tilted and the material in the container 11 sticks to the container. The centre of gravity of the dump vehicle 1 will then move backwards. For example, if the pair of wheels of the rearmost bogie axle 10 looses contact with the ground, which may happen if the vehicle is reversed too close to an edge 32, see FIG. 4, the dump vehicle 1 may rise. Thus, the vehicle 1 would rotate counterclockwise in FIG. 4 around the ground contact points of the wheels of the forward bogie axle 9.

Figure 5:
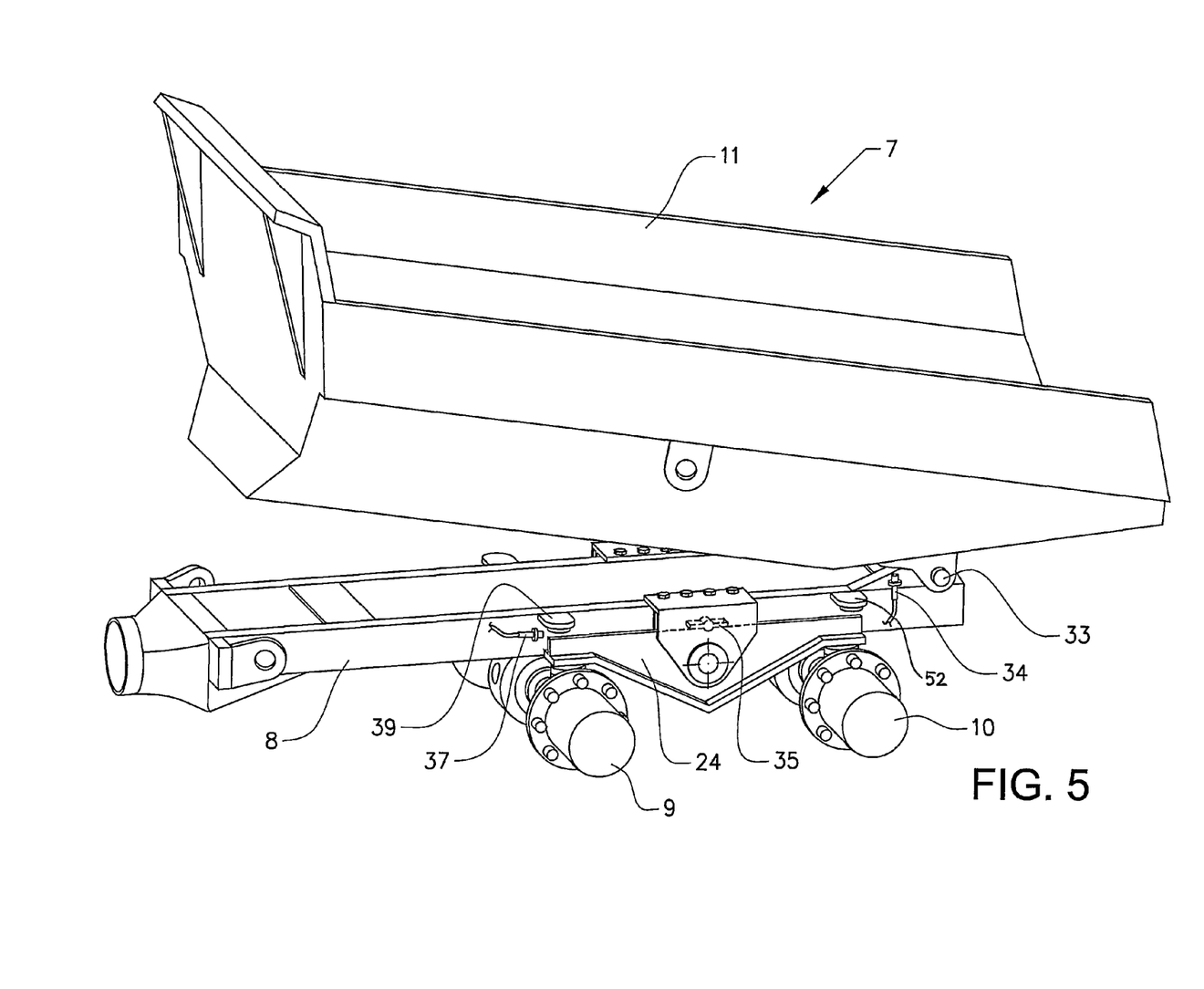
FIG. 5 illustrates a perspective view of part of a rear vehicle section.

FIG. 5 illustrates a perspective view of part of the rear vehicle section 7. The container 11 is tilted upwards relative to the rear frame 8 around the pivot joint 33. The vehicle comprises means 34 for determining an unloading condition. Said means 34 for determining an unloading condition comprises a sensor for sensing the position of the container. More specifically, the sensor 34 is adapted to sense when the container is raised from its position of rest supported on the rear frame 8. More specifically, the sensor 34 senses when the container 11 is tilted a certain angle relative to the rear frame 8.

The vehicle 1 further comprises means 35, 36, 37, 38 for determining if there is a risk for a pair of wheels of the wheel axle of the forward vehicle section to lose ground contact or if said pair of wheels have already-lost ground contact. Said risk determining means comprises a first sensor 35 arranged to sense if at least one wheel on the rear bogie axle 10 loses, or is about to lose, ground contact. More specifically, said first sensor 35 is arranged to sense an inclination of the bogie element 24 relative to a horizontal plane. Said risk determining means further comprises a second sensor 36 arranged in or on the cab for sensing an inclination of the vehicle 1 relative to a horizontal plane. The vehicle further comprises a controller 38, see FIG. 6; connected to the first and second sensors 35, 36. The controller 38 is adapted to, based on inclination signals from the first and second sensor 35, 36, determine whether there is a risk for the vehicle to raise or not.

Said risk determining means comprises a third sensor 37, which is arranged to sense a position of the wheels supported on the rear bogie axle 10 in relation to the rear frame 8. More specifically, said third sensor 37 is inductive and arranged on the rear frame 8 to sense a position of the forward bogie axle 9. A forward and rear mechanical stop, or abutment, 39,52 is provided on the rear frame 8 for limiting the upward movements of the forward and rear bogie axle 9, 10, respectively. More specifically, the third sensor 37 is arranged to sense when the forward bogie axle 9 reaches the forward mechanical stop 39. The third sensor is also connected to the controller 38 for sending a signal to the controller when said forward mechanical stop 39 is reached.

Figure 6:
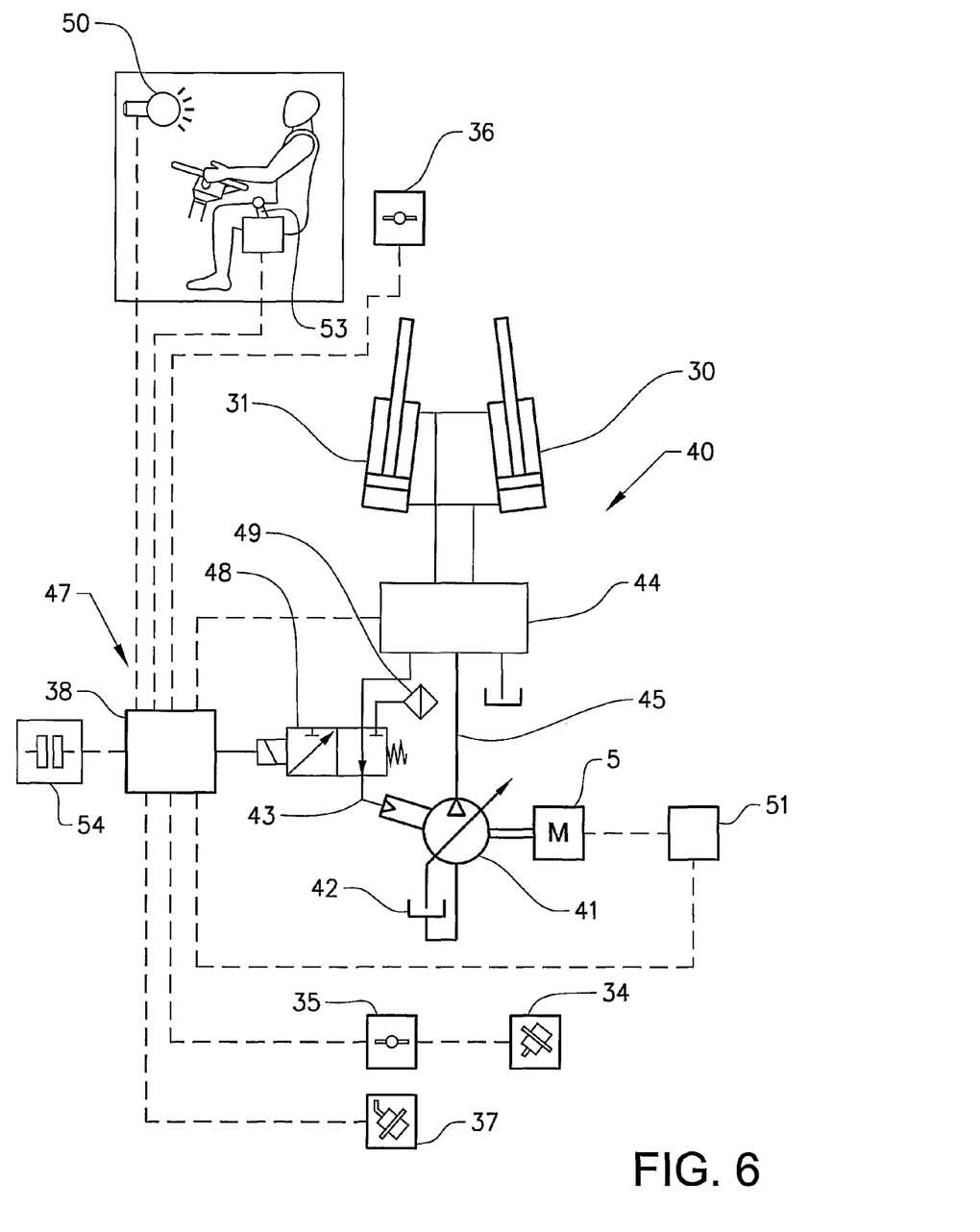
FIG. 6 illustrates a arrangement for preventing overturning of the vehicle of FIG. 1.

FIG. 6 schematically illustrates a hydraulic system 40 for operating the hydraulic cylinders 30, 31. The hydraulic system 40 is load-sensing (LS) and comprises a variable displacement pump 41 for supplying the hydraulic cylinders 30, 31 with hydraulic fluid via a supply line 45 for tilting the container 11 and a tank 42. The pump 41 is driven by the propulsion engine 5 of the vehicle. An electrically controlled valve unit 44 is arranged for regulating the hydraulic fluid flow from the pump 41 to the hydraulic cylinders 30, 31. The control valve unit 44 is further connected to the controller 38. The pump 41 senses the pressure (an LS signal) from the hydraulic cylinders 30, 31 via a load sensing line 43 from the control valve unit 44. The pump 41 then sets a pressure which is a certain number of bar higher than the pressure of the hydraulic cylinders 30, 31. This brings about a hydraulic fluid flow out to the hydraulic cylinders 30, 31, the level of which depends on the extent to which the control valve unit 44 is operated.

FIG. 6 further illustrates an arrangement 47 for preventing overturning of the vehicle 1. The lines marked by solid lines indicate hydraulic fluid lines, and the lines marked by dashed lines indicate lines for electronic signals. Said prevention arrangement 47 comprises means 48 arranged to hinder a supply of hydraulic fluid to the hydraulic cylinders 30, 31. Said hydraulic means 48 comprises an on/off valve arranged on the load sensing line 43. The on/off valve is connected to the controller 38. When the valve is moved to a position, in which the load sensing line is closed, the pump 41 will be turned down and it will thereby be hindered from supplying enough hydraulic fluid to the hydraulic cylinders 30, 31 for continuing tilting the container 11. A breathing filter 49 is connected to the on/off valve in such a way that the pumps are ventilated so that any internal pressure is relieved.

The arrangement 47 further comprises means 50 for informing an operator, preferably located in the cab 6, of the dump vehicle 1 that he should interrupt an initiated tilting motion of the container 11 or that an initiated tilting motion is already automatically interrupted. Said information means 50 preferably comprises a lamp located on a dashboard in the cab 6.

The arrangement 47 further comprises means 51 for automatically preventing a tilting motion of the container 11. The prevention means 51 is arranged to decrease an output of the vehicle engine 5 to such an extent that said hydraulic cylinders 30, 31 does not have enough power to tilt the container 11. The output decrease means comprises an engine control unit 51, which is connected to the controller 38.

A control lever 53, or other operator maneuvering means, for operating the hydraulic cylinders 30, 31 is arranged in the cab 6 and electrically connected to the controller 38.

A method for preventing overturning the dump vehicle 1 during a tilting procedure for unloading material will be described below. More specifically, the risk is determined for the vehicle 1 to tilt backwards around an imaginary axis representing the point of ground contact of the wheels of the forward bogie axle $S_1$ raising the forward vehicle section 2, wherein the wheels of the forward wheel axle 4 would lose ground contact. In the raised state, there is a risk for the forward vehicle section to rotate relative to the rear vehicle section via said second articulation joint 21 and thereby turn over.

In a first step, one determines if the vehicle is in an unloading condition, i.e if it is about to unload material from its container 11. The position of the container 11 is determined and used as an indication of that the unloading condition is confirmed.

In a second step, one determines if there is a risk for the wheels of the forward wheel axle 4 to lose ground contact or if said pair of wheels have already lost ground contact. According to a first embodiment, an inclination of the bogie element 24 is measured and if the measured inclination is larger than a predetermined angle, there is a risk for the vehicle to be overturned.

In a third step, the further tilting of the container 11 is automatically prevented. According to a first embodiment, a supply of hydraulic fluid to the hydraulic cylinders 30, 31 is hindered by closing the load sensing line 43 to the pump 41.

As an alternative to the example described in the first method step, a signal from the control lever 53 is received by the controller 38 and used as an indication that the vehicle is in the unloaded condition.

According to a second embodiment of the second step, a position of the forward bogie axle 9 is sensed. More specifically, it is sensed when the forward bogie axle 9 reaches the mechanical stop 39 on the frame.

According to a second embodiment of the third step, an output of the engine 5 is decreased to such an extent that said hydraulic cylinders 30, 31 does not have enough power to continue tilting the container[1] 11.

According to a third embodiment of the third step, an operator of the dump vehicle 1 is informed that he should manually interrupt an initiated tilting motion of the container 11. The operator may be warned by flashing the lamp 50 in the cab 6.

The embodiments of the second and third step may of course be combined in any way. A plurality of the method step embodiments may further be performed simultaneously. For example, the further tilting of the container 11 may be interrupted automatically in the third step and in addition the lamp 50 in the cab 6 may be flashed for informing the operator.

As a complement or an alternative to the example described in the third method step, a rotation of the forward vehicle section in relation to the rear vehicle section is prevented or interrupted by locking the forward and rear vehicle frames 3, 8 from moving relative to one another or at least significantly brake said relative movement. A prerequisite is of course that there is such a lock, brake or clutch 54 for inhibiting the relative motion of the forward vehicle section to the rear vehicle section.

Further, the second method step may be eliminated. The overturning prevention may in such a case take place in that a signal from the control lever 53 or the container position sensor 34 is received by the controller 38 and used as an indication that the vehicle is in the unloaded condition. In response to such a signal, the controller 38 can actuate the above mentioned rotation inhibiting means 54.

In certain unloading situations, there is a risk for the vehicle to be raised when the wheels of the forward bogie axle 9 lose ground contact and only the wheels of the wheels on the rear bogie axle 10 has ground contact. Such a situation may occur when the vehicle is unloaded in a steep slope. It would be obvious for the man skilled in the art to modify the arrangement described above for this situation. For example, as a further alternative/complement to arranging the third sensor 37 to sense when the forward bogie axle 9 reaches the mechanical stop 39, a similar sensor may be arranged to sense when the rear bogie axle 10 reaches the mechanical stop 52.

The controller 38 comprises a memory, which in turn comprises a computer program with computer program segments, or a program code, for implementing the prevention method when the program is run. This computer program can be transmitted to the controller in various ways via a transmission signal, for example by downloading from another computer, via wire and/or wirelessly, or by installation in a memory circuit. In particular, the transmission signal can be transmitted via the Internet.

The invention also relates to a computer program product comprising computer program segments stored on a computer-readable means for implementing the measurement method when the program is run. The computer program product can comprise, for example, a diskette.

The invention is not in any way limited to the above described embodiments, instead a number of alternatives and modifications are possible without departing from the scope of the following claims.

More specifically, there are a number of alternatives apparent for the man skilled in the art once presented with the inventive concept. According to one example, a relative pivotal position of the forward frame relative to the rear frame is determined by inclination sensors. When the relative inclination exceeds a predetermined angle, it is an indication that the forward vehicle section is about to rotate relative to the rear vehicle section.

As an alternative to the example described in the second method step, a position of at least one wheel on the forward wheel axle of the forward vehicle section 2 in relation to the forward frame 3 is sensed. When the relative distance exceeds a predetermined value, it indicates that the axle is relieved from pressure and that the wheels of the forward wheel axle 4 have lost ground contact.

As an alternative to the example described in the second method step, a pressure on the rear bogie axle 10 is sensed. When the axle 10 is relieved from pressure, it indicates that the wheels of the rear bogie axle 10 have lost ground contact. Consequently, a pressure on the forward axle 4 of the forward vehicle section 2 is sensed. When the axle 4 is relieved from pressure, it indicates that the wheels of the forward wheel axle 4 have lost ground contact.

As a further alternative, the first method step may be eliminated. In such a case, the determination if there is a risk for the wheels of the forward wheel axle to lose ground contact or if said pair of wheels have already lost ground contact is performed automatically during operation of the vehicle.

As a further alternative, said tilting motion prevention means 48 arranged to hinder a supply of hydraulic fluid to the hydraulic cylinders 30, 31 may comprise hydraulic means 48 comprising a control valve on the supply conduit 45 between the pump and the hydraulic cylinders 30, 31.

As a further alternative, said risk determining means may as an alternative to said first and second sensors 35, 36 comprise a sensor adapted to sense an inclination of the bogie element 24 relative to the rear frame 8.

The invention claimed is:

1. A method for preventing overturning a dump vehicle (1), which comprises a forward vehicle section (2) with a forward frame (3) and a wheel axle (4) supported by the rear frame, a rear vehicle section (7) with a rear frame (8) and at least one wheel axle (9,10) supported by the frame, and an articulation joint (21), which connects the forward frame (3) and the rear frame (8) and allows the forward frame and the rear frame to pivot in relation to each other about an axis extending in a longitudinal direction of the vehicle characterized in, during a tilting procedure for unloading material from a container (11) of the dump vehicle,
    determining if there is a risk for a pair of wheels of the wheel axle (4) of the forward vehicle section (2) to loose ground contact or if said pair of wheels have already lost ground contact, and
    establishing a warning signal for preventing an uncontrolled rotation of the forward vehicle section (2) relative to the rear vehicle section (7) via the articulation joint (21) when it is determined that the wheels of the forward wheel axle has lost or is about to loose ground contact.

2. A method according to claim 1, characterized in determining if at least one wheel in a pair of wheels on the wheel axle (9,10) supported on the rear frame (8) looses, or is about to loose, ground contact, and using this information for determining the risk for the wheels of the wheel axle (4) of the forward vehicle section (2) to loose ground contact.

3. A method according to claim 1, characterized in that a forward and a rear wheel axle (9,10) are supported on the rear frame (8), and determining if at least one wheel in a pair of wheels on the rear wheel axle (10) looses, or is about to loose, ground contact, and using this information for determining the risk for the wheels of the wheel axle (4) of the forward vehicle section (2) to loose ground contact.

4. A method according to any of claims 1-3, characterized in sensing a position of at least one wheel in a pair of wheels on the wheel axle (9,10) supported on the rear frame (8) in relation to the rear frame, and using this information for determining the risk for the wheels of the wheel axle (4) of the forward vehicle section (2) to loose ground contact.

5. A method according to any of claims 1-3, characterized in that a forward and a rear wheel axle (9,10) are supported on the rear frame (8), and sensing a position of at least one wheel in a pair of wheels on the rear wheel axle (10) in relation to the rear frame, and using this information for determining the risk for the wheels of the wheel axle (4) of the forward vehicle section (2) to loose ground contact.

6. A method according to any preceding claim, characterized in sensing a position of the wheel axle (9,10) of the rear vehicle section (7) and using this information for determining the risk for the wheels of the wheel axle (4) of the forward vehicle section (2) to loose ground contact.

7. A method according to any of claims 1-5, characterized in that a forward and a rear wheel axle (9,10) are supported on the rear frame (8), sensing a position of a forward wheel axle (9) and using this information for determining the risk for the wheels of the wheel axle (4) of the forward vehicle section (2) to loose ground contact.

8. A method according to claim 6 or 7, characterized in sensing when one of the wheel axles (9,10) of the rear vehicle section (7) reaches a mechanical stop (39,52) on the rear frame.

9. A method according to claim 7, characterized in sensing when the forward wheel axle (9) of the rear vehicle section (7) reaches a mechanical stop (39) on the rear frame.

10. A method according to any preceding claim, characterized in sensing an inclination of a bogie element (24), which is pivotably suspended in a frame beam of the rear vehicle section (7), and using this information for determining the risk for the wheels of the wheel axle (4) of the forward vehicle section (2) to loose ground contact.

11. A method according to any preceding claim, characterized in determining an unloading condition and initiating the determination if there is a risk for a pair of wheels of the wheel axle (4) of the forward vehicle section (2) to loose ground contact or if said pair of wheels have already lost ground contact only if said unloading condition is confirmed.

12. A method according to claim 11, characterized in a position of the container (11) is determined and used as an indication of that the unloading condition is confirmed.

13. A method according to claim 11, characterized in an actuation of an operator manouevrable means (53) is determined and used as an indication of that the unloading condition is confirmed.

14. A method according to any preceding claim, characterized in receiving said warning signal and automatically preventing tilting of the container (11).

15. A method according to claim 14, characterized in hindering a supply of hydraulic fluid to a hydraulic tilting means (30,31), which is arranged between the rear frame (8) and the container (11) for tilting the container relative to the rear frame.

16. A method according to claim 14 or 15, characterized in decreasing an output of a vehicle engine (5), which is arranged to provide a tilting means (30,31) arranged between the rear frame and the container (11) for tilting the container relative to the rear frame, to such an extent that said tilting means does not have enough power to tilt the container.

17. A method according to any of the preceding claims, characterized in receiving said warning signal and informing an operator of the dump vehicle (1) that there is a risk for overturning of the vehicle.

18. An arrangement (47) for preventing overturning a dump vehicle (1), which vehicle comprises a forward vehicle section (2) with a forward frame (3) and a wheel axle (4) supported by the rear frame, a rear vehicle section (7) with a rear frame (8) and at least one wheel axle (9,10) supported by the frame, and an articulation joint (21), which connects the forward frame (3) and the rear frame (8) and allows the forward frame and the rear frame to pivot in relation to each other about an axis extending in a longitudinal direction of the vehicle characterized in, that the arrangement comprises means (34,35,36,37,53) for determining if there is a risk for a pair of wheels of the wheel axle (4) of the forward vehicle section (2) to loose ground contact or if said pair of wheels have already lost ground contact, and means (38) for establishing a warning signal for preventing an uncontrolled rotation of the forward vehicle section (2) relative to the rear vehicle section (7) via the articulation joint (21) when it is determined that the wheels of the forward wheel axle (4) has lost or is about to loose ground contact.

19. An arrangement according to claim 18, characterized in, that said risk determining means comprises a sensor (35, 36,37) arranged to sense if at least one wheel in a pair of wheels on the wheel axle (9,10) supported on the rear frame loses, or is about to loose, ground contact.

20. An arrangement according to claim 18, characterized in, that a forward and a rear wheel axle (9,10) are supported on the rear frame (8), that said risk determining means comprises a sensor (35,36,37) arranged to sense if at least one wheel in a pair of wheels on the rear wheel axle (10) loses, or is about to loose, ground contact.

21. An arrangement according to claim 19 or 20, characterized in, that said sensor (35,37) is arranged to sense a position of at least one wheel in a pair of wheels supported on a wheel axle (9,10) in relation to the rear frame (8).

22. An arrangement according to claim 19 or 20, characterized in, that a forward and a rear wheel axle (9,10) are supported on the rear frame (8), that said sensor (35,37) is arranged to sense a position of at least one wheel in a pair of wheels supported on the rear wheel axle (10) in relation to the rear frame (8).

23. An arrangement according to any of claims 19-22, characterized in, that said sensor (37) is arranged to sense a position of the wheel axle (9,10) of the rear vehicle section (7).

24. An arrangement according to any of claims 19-22, characterizedin, that a forward and a rear wheel axle (9,10) are supported on the rear frame (8), that said sensor (37) is arranged to sense a position of a forward wheel axle (9) of the rear vehicle section (7).

25. An arrangement according to claim 23 or 24, characterized in, that said sensor (37) is arranged to sense when the wheel axle (9,10) of the rear vehicle section (7) reaches a mechanical stop (39,52) on the rear frame (8).

26. An arrangement according to any of claims 18-25, characterized in, that sensor (35) is arranged to sense an inclination of a bogie element (24), which is pivotably suspended in a frame beam of the rear vehicle section (7).

27. An arrangement according to any of claims 18-26, characterized in, that the arrangement (47) comprises means (34,53) for determining an unloading condition.

28. An arrangement according to claim 27, characterized in, that said means for determining an unloading condition comprises a sensor (34) for sensing the position of the container (11).

29. An arrangement according to claim 27 or 28, characterized in, that said means for determining an unloading condition comprises an operator manouevrable means (53) for actuation of tilting the container (11).

30. An arrangement according to any of claims 18-29, characterized in, that the arrangement (47) comprises means (48,51) for automatically preventing a tilting motion of the container (11).

31. An arrangement according to claim 30, characterized in, that said prevention means (48) is arranged to hinder a supply of hydraulic fluid to a hydraulic tilting means (30,31), which is arranged between the rear frame (8) and the container (11) for tilting the container relative to the rear frame.

32. An arrangement according to claim 30 or 31, characterized in, that said prevention means (51) is arranged to decrease an output of a vehicle engine (5), which is arranged to provide tilting means (30,31) arranged between the rear frame (8) and the container (11) for tilting the container relative to the rear frame, to such an extent that said tilting means does not have enough power to tilt the container.

33. An arrangement according to any of claims 18-32, characterized in, that the arrangement (47) comprises means (50) for informing an operator of the dump vehicle that there is a risk for overturning of the vehicle.

34. A dump vehicle comprising the forward vehicle section (2) with the forward frame (3) and the wheel axle (4) supported by the frame, the rear vehicle section (7) with the rear frame (8) and the at least one wheel axle (9,10) supported by the rear frame, and the articulation joint (21), which connects the forward frame (3) and the rear frame (8) and allows the forward frame and the rear frame to pivot in relation to each other about an axis extending in a longitudinal direction of the vehicle, characterized in, that the vehicle comprises an overturning prevention arrangement (47) according to any of claims 18-33.

35. A computer program comprising computer program segments for implementing the method as claimed in any one of claims 1-17 when the program is run on a computer.

36. A computer program product comprising computer program segments stored on a computer-readable means for implementing the method as claimed in any one of claims 1-17 when a program is run on a computer.

* * * * *